United States Patent [19]
Bowman

[11] Patent Number: 4,764,835
[45] Date of Patent: Aug. 16, 1988

[54] SAFETY APPARATUS

[76] Inventor: Ben Bowman, Rt. 1, Box 33A, Quemado, Tex. 78877

[21] Appl. No.: 18,511

[22] Filed: Feb. 25, 1987

[51] Int. Cl.$^4$ .............................................. H02H 5/12
[52] U.S. Cl. ....................................... 361/1; 307/326; 361/115; 340/568; 192/133
[58] Field of Search .................. 361/1, 114, 115, 142, 361/179, 180, 25, 213; 307/326, 328; 200/44, 45, 61.19, 61.41, 61.4 L; 192/129 R, 133; 340/507, 568, 569, 570; 219/147

[56] References Cited
U.S. PATENT DOCUMENTS
3,818,238 6/1974 Lemire .................................. 361/25
3,893,095 7/1975 De Jong .......................... 340/568 X
3,912,061 10/1975 Foster, Jr. ........................... 192/133

Primary Examiner—Roy N. Envall, Jr.
Assistant Examiner—Todd E. DeBoer
Attorney, Agent, or Firm—Leon Gilden

[57] ABSTRACT

A box designed for holding safety apparatus, such as face and eye protecting shields used in conjunction with grinders and the like, is electrically wired to such grinder or similar shop equipment. When the face and eye protector is stored within the box, the electrical circuit to the grinder remains open so that it cannot be used. A user of the grinder must first remove the face and eye protector from the box, presumably to use the protector in the prescribed manner, and a spring actuated switch then closes the electrical circuit so that the grinder may be operated.

2 Claims, 2 Drawing Sheets

SAFETY APPARATUS

BACKGROUND OF THE INVENTION

1. Field of the Invention

The present invention relates to safety apparatuses, and more particularly pertains to a safety equipment storage box which requires the removal of the safety equipment before associated electrically powered equipment can be operated.

2. Description of the Prior Art

The use of safety apparatuses intended to safeguard the operation of a machine so as to remind operators to wear eye to face protectors is known in the prior art. For example, reference is made to U.S. Pat. No. 3,818,238, which issued to G. Lamire on June 18, 1974. The Lamire device comprises a grinder, or some similar equipment, which requires an operator to wear an eye or face protector by having the protector effectively operating as a switch means connected by the electric circuit to the machine motor. Only when the protector is in a normal position of use will the machine operate. As such, an operator is forced to wear the eye or face protector to close the electrical circuit to the grinder.

The Lamire device is illustrative of a far larger number of patents directed to the construction of similar safety apparatuses. However, all of these prior art devices involve the use of eye or face protectors which are directly wired to the electrical circuit of the associated machinery. As can be appreciated, the electrical interconnection of such eye and face protectors to the electrical circuits of machinery involves a complex and expensive procedure, and also severely limits the mobility of the operator whereby the eye and face protector must be removed before he can move any substantial distance from the operating machine.

While these prior art devices are functional for their intended purposes, there appears to be a continuing need for better designed safety apparatuses which would increase the mobility of an operator while assuring a use of a face and eye protector by the operator during equipment use. In this respect, the present invention substantially fulfills this need.

SUMMARY OF THE INVENTION

In view of the foregoing disadvantages inherent in the known types of safety apparatuses now present in the prior art, the present invention provides an improved safety apparatus wherein the same operates as a reminder to a machine operator to wear an associated face and eye protector by maintaining a power circuit in an open condition when the face and eye protector is stored within a box. As such, the general purpose of the present invention, which will be described subsequently in greater detail, is to provide a new and improved safety apparatus which has all the advantages of the prior art safety apparatuses and none of the disadvantages.

To attain this, the present invention comprises a storage box for holding a face and eye protector which should be worn during the use of certain machinery. The machinery requiring the use of such a face and eye protector is electrically wired to the box, whereby the face and eye protector effectively presses against a switch to keep the power circuit in an open condition. When the operator removes the face and eye protector from the box, presumably to use the same, the spring-loaded switch is allowed to close, thus to provide power to the machinery.

There has thus been outlined, rather broadly, the more important features of the invention in order that the detailed description thereof that follows may be better understood, and in order that the preset contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved safety apparatus which has all the advantages of the prior art safety apparatuses and none of the disadvantages.

It is another object of the present invention to provide a new and improved safety apparatus which may be easily and efficiently manufactured and marketed.

It is a further object of the present invention to provide a new and improved safety apparatus which is of a durable and reliable construction.

An even further object of the present invention is to provide a new and improved safety apparatus which is susceptible of a low cost of manufacture with regard to both materials and labor, and which accordingly is then susceptible of low prices of sale to the consuming public, thereby making such safety apparatuses economically available to the buying public.

Still yet another object of the present invention is to provide a new and improved safety apparatus which provides in the apparatuses and methods of the prior art some of the advantages thereof, while simultaneously overcoming some of the disadvantages normally associated therewith.

Still another object of the present invention is to provide a new and improved safety apparatus which operates as a reminder to an operator to wear a required face and eye protector.

Yet another object of the present invention is to provide a new and improved safety apparatus which essentially comprises a box for holding a face and eye protector, and the like, with the face and eye protector, when stored, maintaining an electric power circuit in an open condition.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
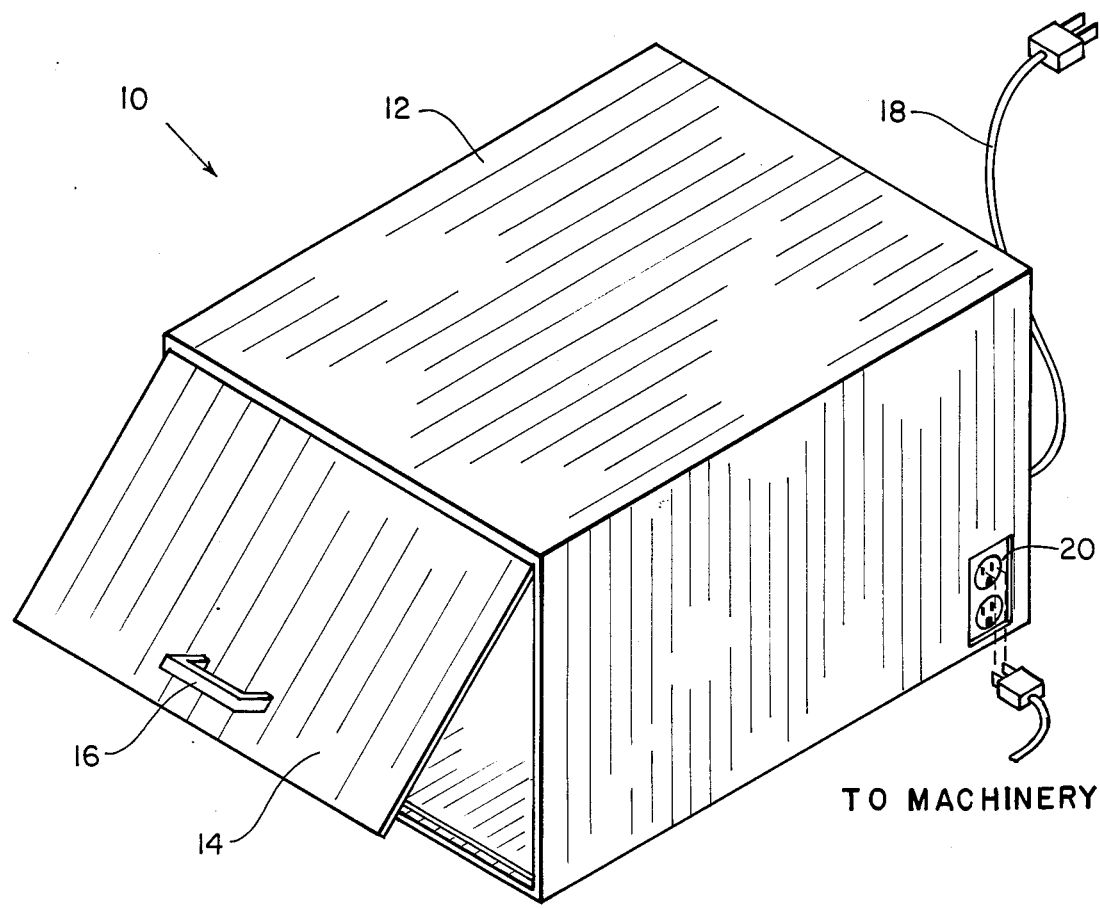
FIG. 1 is a perspective view of the safety apparatus comprising the present invention.
Figure 2:
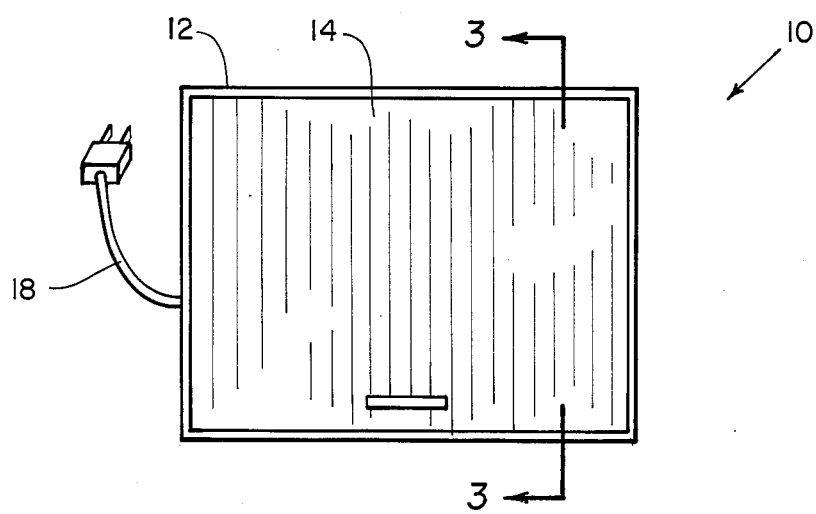
FIG. 2 is a front elevation view of the invention.

With reference now to the drawings, and in particular to FIGS. 1 and 2 thereof, a new and improved safety apparatus embodying the principles and concepts of the present invention and generally designated by the reference numeral 10 will be described.

More specifically, it will be noted that the safety apparatus 10 essentially comprises a storage box 12 having a front hingedly movable door 14. The front door 14 is either spring loaded or weighted for a purpose which will be subsequently described. The door 14 is provided with an appropriate handle 16 to facilitate an opening and closing thereof, while an electric power lead 18 is attached to a rear portion of the box 10. The electric power lead 18 is directed to a conventional female electrical receptacle 20 mounted to a sidewall of the box 12, which provides for the electrical attachment of operating machinery thereto.

It is to be understood that the shape and size of the box 12 is substantially variable to accommodate different types of safety equipment which may be stored therein, and all such conceivable shapes and sizes are within the intent and purview of the present invention.

Figure 3:
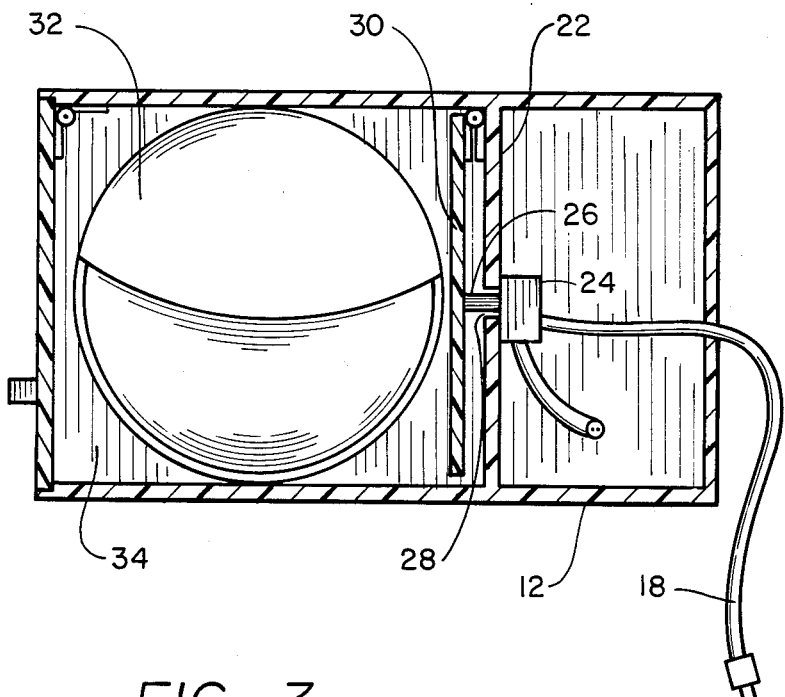
FIG. 3 is a cross-sectional view of the invention taken along the line 3—3 in FIG. 2.
Figure 4:
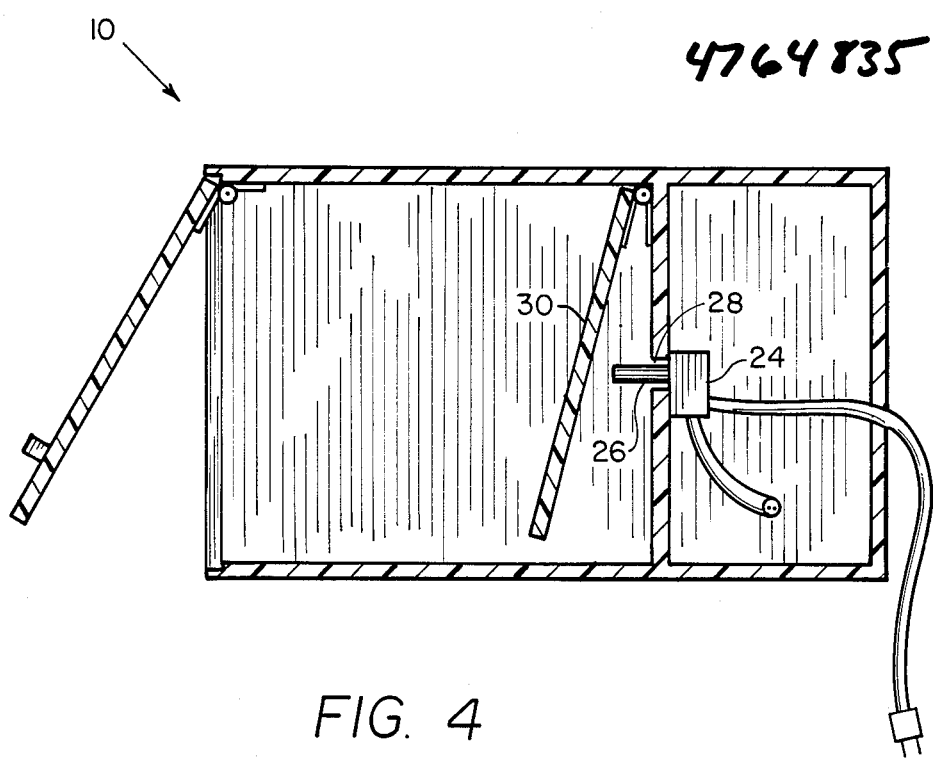
FIG. 4 is a cross-sectional view of the invention showing the operation of the electrical circuit when the face and eye protector is removed.

FIGS. 3 and 4 of the drawings illustrate the interior compartment design of the box 12, as well as its manner of operation. In this respect, it can be seen that an interior portion of the box 12 includes an intermediately aligned support wall 22 into which is mounted an electrical switch 24. The electrical switch 24 includes a spring-biased button 26 mounted to an aperture 28 formed through the wall 22, with an end of the switch button being abuttable against a hingedly swingable door 30 mounted proximate the intermediate wall.

As illustrated, the electrical cord 18 has the electric switch 24 mounted thereto, with the switch operating to open and close the electrical circuit defined by the electric cord. As shown in FIG. 3, a conventional face and eye protector 32 is storable in an interior compartment 34 defined within the box 12, with the face and eye protector being normally abuttable against the hinged door 30 to thus force it into contact with the button switch 26. When the button switch 26 is compressed into the switch housing 24, the electrical circuit through the electric cord 18 is opened, whereby no electric power can flow therethrough.

Presuming that a piece of operating equipment, such as a grinder or the like, is plugged into the receptacle 20 mounted to an exterior surface of the box 12, electric power is deliverable to the grinder through the electric cord 18 when the same is plugged into a conventional electrical outlet. However, when the face and eye protector 32 is retained within the box 10, the switch button 26 is depressed thus to open the electrical circuit and cut off the supplying of power to the machinery. In this respect, the front door 14, as aforementioned, is either spring loaded or weighted so as to assert pressure on the eye protector 32, which in turn applies a pressure against the hinged middle door 30 so as to press against the button switch 26.

As illustrated in FIG. 4, once an operator removes the face and eye protector 32, presumably to use the same, the spring biased construction of the button switch 26 allows it to move the hinged door 30 forwardly while a concurrent closing of the electrical switch 24 is accomplished and as such, electric power is then supplied to the grinder, or such similar machinery. Accordingly, the safety apparatus 10 at least requires an operator to remove the face and eye protector 32 before utilizing the associated equipment, thus effectively operating as a reminder to the operator of the importance of using such safety equipment.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved safety apparatus comprising:

housing means for use in combination with safety equipment for securing therein said safety equipment which should be used during operation of certain machinery;

electric power supply means mounted to said housing means, certain machinery being operated by said electric power supply means; and switch means mounted in said housing means and being operable to control a supplying of electric power to said machinery by selectively opening and closing an electric circuit forming a part of said electric power supply means, switch means being operably controlled by a positioning of safety equipment within said housing means;

said safety equipment is abuttable against a pivotal hinged door cooperative with said switch means to effect said opening of said electric circuit, said closing of said electric circuit being accomplished by a removal of said safety equipment from said housing means, and said switch means is mounted in an interior wall portion of said housing means adjacent said pivotal hinged door, said interior wall portion forming a sidewall of an interior compartment into which said safety equipment is positioned, and said switch means is of a spring biased construction and includes a switch button, said switch button selectively opening said electric circuit during a depression thereof as caused by an abutment with said pivotal hinged door when said safety equipment is positioned within said interior compartment, and wherein said switch button extends through an aperture formed in said interior wall portion.

2. The new and improved safety apparatus as described in claim 1, wherein said electric power supply means includes an electrical receptable mounted to said housing means, said certain machinery being operably attached to said electric receptacle to effect a supplying of electric power thereto.

* * * * *